US012748054B2

(12) United States Patent
Michaud

(10) Patent No.: US 12,748,054 B2
(45) Date of Patent: Sep. 29, 2026

(54) METHOD FOR INSPECTING FOR SURFACE DEFECTS ON A CAST PART MADE OF SINGLE-CRYSTAL METAL AND SYSTEM FOR IMPLEMENTING SAME

(71) Applicant: SAFRAN, Paris (FR)

(72) Inventor: Franck Michaud, Moissy-Cramayel (FR)

(73) Assignee: SAFRAN, Paris (FR)

( * ) Notice: Subject to any disclaimer, the term of this patent is extended or adjusted under 35 U.S.C. 154(b) by 256 days.

(21) Appl. No.: 18/576,046

(22) PCT Filed: Jun. 23, 2022

(86) PCT No.: PCT/FR2022/051234
§ 371 (c)(1),
(2) Date: Jan. 2, 2024

(87) PCT Pub. No.: WO2023/285745
PCT Pub. Date: Jan. 19, 2023

(65) Prior Publication Data

US 2024/0310294 A1 Sep. 19, 2024

(30) Foreign Application Priority Data

Jul. 12, 2021 (FR) ....................................... 2107543

(51) Int. Cl.
*G01N 21/88* (2006.01)
*G01N 21/95* (2006.01)

(52) U.S. Cl.
CPC ..... *G01N 21/8851* (2013.01); *G01N 21/8806* (2013.01); *G01N 21/95* (2013.01);
(Continued)

(58) Field of Classification Search
CPC ........... G01N 21/8851; G01N 21/8806; G01N 21/95; G01N 2021/8848;
(Continued)

(56) References Cited

U.S. PATENT DOCUMENTS

2016/0063733 A1* 3/2016 Dellea ................ G01N 21/4788 382/108
2018/0073979 A1* 3/2018 Cho ........................ H04N 23/56
2021/0048384 A1* 2/2021 Fortune .............. G01N 33/2045

FOREIGN PATENT DOCUMENTS

FR 988 841 A1 10/2013

OTHER PUBLICATIONS

Xiaogang, W., et al., "Measuring crystal orientation from etched surfaces via directional reflectance microscopy," J Mater Sci (Year: 2020) 55: pp. 11669-11678.

(Continued)

*Primary Examiner* — Isiaka O Akanbi
(74) *Attorney, Agent, or Firm* — CUSHMAN PARTNERS, LLC

(57) ABSTRACT

A method for inspecting the surface finish of a cast part made of single-crystal metal, the surface of the part potentially containing defects resulting from an inhomogeneity of orientation of at least a crystal lattice of the single-crystal metal, the method including acquiring, using an image-acquiring device, a series of images of the cast part illuminated by a polarized and collimated illuminating device, then analysing the series of images by an image-processing device, each image of the series of images being taken at a different polarization angle.

9 Claims, 2 Drawing Sheets

(52) U.S. Cl.
CPC ................ *G01N 2021/8848* (2013.01); *G01N 2201/0633* (2013.01)

(58) Field of Classification Search
CPC ....... G01N 2201/0633; G01N 33/2045; G01N 2021/8477; G06T 2207/10141; G06T 7/0004
USPC ........................................... 356/237.2, 237.6
See application file for complete search history.

(56) References Cited

OTHER PUBLICATIONS

Gaskey, B., et al., "Optical characterization of grain orientation in crystalline materials," Acta Materialia 194 (Year: 2020), pp. 558-564.

Newton, C. J., et al., "Correlation of Polarized Light Phenomena With the Orientation of Some Metal Crystals," Journal of Research of the National Bureau of Standards vol. 53, No. 1, Jul. 1954, pp. 1-12.

International Search Report as issued in International Patent Application No. PCT/FR2022/051234, dated Oct. 24, 2022.

* cited by examiner

METHOD FOR INSPECTING FOR SURFACE DEFECTS ON A CAST PART MADE OF SINGLE-CRYSTAL METAL AND SYSTEM FOR IMPLEMENTING SAME

CROSS-REFERENCE TO RELATED APPLICATIONS

This application is the U.S. National Stage of PCT/FR2022/051234, filed Jun. 23, 2022, which in turn claims priority to French patent application number 2107543 filed Jul. 12, 2021. The content of these applications are incorporated herein by reference in their entireties.

TECHNICAL FIELD OF THE INVENTION

The present invention relates to a method for inspecting the surface condition of a single-crystal metal foundry piece, the surface of the piece being liable to include defects resulting from an inhomogeneity in the orientation of at least one crystal lattice of the single-crystal metal. The invention also relates to a system for implementing this inspection method.

The invention finds applications in the fields of foundry single-crystal metal or alloy pieces and, in particular, in the field of manufacturing metal or metal alloy foundry pieces for aeronautics.

TECHNOLOGICAL BACKGROUND TO THE INVENTION

Foundry makes it possible to manufacture complex metal pieces and, in particular, aeronautical pieces such as high-pressure engine turbine blades. Foundry pieces can be manufactured from a single-crystal metal or alloy. These single-crystal metal or alloy pieces should then be made up of crystal lattices having a homogeneous orientation. In other words, the orientation of the crystal lattices should be identical for all, or at least a very large majority, of the crystal lattices in the piece.

In aeronautics, the surface condition of each single-crystal metal or alloy foundry piece is inspected so as to check that the crystal orientation is homogeneous over the entire surface of the piece. Indeed, when the crystal lattices of a piece have different orientations, cracks or other defects can develop, especially at the junction of the crystal lattices, causing serious damage to the piece. To avoid such damage, each aeronautical piece is inspected and the presence of grain junctures, that is, a boundary between two crystal lattices with different orientations, is detected. The level of inhomogeneity in the crystal orientation, namely the number of crystal lattices with different orientations, is determined. If this level exceeds a predefined acceptability threshold, the piece is scrapped.

A reference technique in metallurgy for inspecting the surface condition of pieces in crystal orientation uses an Electron BackScatter Diffraction (EBSD or Backscatter Kikuchi Diffraction (BKD) method. This method not only implements very expensive instruments, but also involves a major preparation of the measurement sample, which has to be planar and polished. In addition, the surface area to be analysed by scanning is relatively small (in the order of one $mm^2$ or $cm^2$) and measurement by scanning the electron beam is time-consuming and is not compatible with rapid sorting of production pieces.

Other optical methods have been implemented more recently, such as BRDF (Bidirectional Reflectance Distribution Function) inspection. BRDF inspection is a method used by extension of empirical experience of inspections that were previously carried out with the naked eye by operators. This method is based on the fact that after a chemical etching on the piece, the presence of different grains visually produces a variation in luminous contrast on the surface of the piece, by virtue of a variation in the reflectance of said piece. Previously, an operator would look for these variations in luminous contrast on the surface of the piece with the naked eye. For this, he tilted the piece at different angles to see differences in reflectivity on the surface of the piece. Even for a trained and experienced operator, these inspection operations were delicate and required great concentration of the inspector, because any failure of the operator could result in a critical decision, with either the acceptance of a piece whose condition did not reach the acceptability threshold, or the scrapping of an acceptable piece. Compared with the empirical method, BRDF inspection facilitates the work of operators by implementing an optical inspection bench to measure the reflectance function of the piece and deduce the geometry of its crystal orientation therefrom. A controlled angular displacement of the lighting and measurement instrument is required as described in the articles <Measuring crystal orientation from etched surfaces via directional reflectance microscopy "by Wang Xiaogang, in J Mater Sci (2020) 55:11669-11678 and "Optical characterization of grain orientation in crystalline materials" by Bernard Gaskey, in Acta Materialia 194 (2020) 558-564).

Techniques for inspecting the surface condition of pieces based on the backscatter electron diffraction method (such as EBSD) are difficult to integrate on a production line and for complex mechanical pieces. Optical techniques have the advantage of providing greater versatility for measurements in a complex environment and for non-destructive inspection, but they are poorly adapted to the industrial context.

There is therefore a need for an improved automated inspection method and device for assisting operators in their task of inspecting the surface condition of single-crystal metal or alloy pieces.

SUMMARY OF THE INVENTION

To address the problems discussed above and to assist operators in inspecting the surface condition of foundry pieces, the applicant provides a method and a system for inspecting the surface condition of single-crystal metal or alloy pieces, based on an analysis of a series of images made for different orientations of the polarisation of the light reflected by the surface of the piece.

According to a first aspect, the invention relates to a method for inspecting the surface condition of a single-crystal metal foundry piece, the surface of the piece including possible defects resulting from an inhomogeneity in the orientation of at least one crystal lattice of the single-crystal metal, said method including:

- acquiring, by an image acquisition device, a series of images of the foundry piece lit by means of a polarised, collimated lighting device, and then
- analysing the series of images by means of an image processing device, this analysis including the following operations:
  - determining, for each pixel of the image acquisition device, an intensity vector corresponding to an intensity variation of the same pixel in each image in the series of images,

- determining an average intensity of all the pixels of each image in the series of images and extracting a law of general intensity variation for the series of images,
- determining a law of individual intensity variation, specific to each crystal lattice, and
- determining the pixels belonging to a same crystal lattice, each image in the series of images being made at a different polarisation angle.

Polarised lighting used in this method makes it possible to enhance reflectance contrast on the surface of the piece. Furthermore, the analysis of the series of images made at different polarisation angles makes it possible to generate an image of the part highlighting the different grains. This method has the further advantage of being easy to automate.

It will be understood that the expression "single-crystal metal" used in the description and the claims includes all metals and alloys of the single-crystal type. The foundry pieces to be inspected with the method and/or system according to the invention are single-crystal metal or single-crystal alloy foundry pieces whose crystal lattices should have a homogeneous orientation.

The terms "grains" or "disoriented crystal lattices" or "crystal lattices with different orientations" used in the description and the claims have an identical meaning, a grain being a crystal lattice whose orientation does not conform to the expected orientation. A grain juncture is therefore a boundary between two crystal lattices of different orientation.

In addition to the characteristics just discussed in the preceding paragraph, the inspection method according to one aspect of the invention may have one or more additional characteristics from among the following, considered individually or according to any technically possible combinations:

- the polarisation angle is modified by rotating an axis of polarisation of the image acquisition device.
- the operation of determining the pixels belonging to a same crystal lattice is obtained by matching pixels having alike intensity variations.
- the operation of determining a law of individual intensity variation is obtained by normalising the intensity of each pixel as a function of the law of general intensity variation.
- the lighting device generates a beam of incoherent, linearly polarised light.
- the method includes a prior operation of chemically etching the foundry piece to reveal the crystals on the surface of the foundry piece.

A second aspect of the invention relates to a system for implementing of the inspection method defined above, this system including:

- a polarised, collimated lighting device,
- an image acquisition device, and
- an image processing device.

The combination of a fixed lighting device and a fixed camera makes it possible to highlight the differences in reflectance on the surface of the piece simply by rotating a polariser in front of the camera, without any relative movement of the piece and the lighting and without any problem of shadowing or depth of field for curved pieces.

This inspection system according to a second aspect of the invention may have one or more complementary characteristics from among the following, considered individually or according to all technically possible combinations:

- the lighting device includes an incoherent light source, coupled to a first linear polariser and to collimation optics.
- the image acquisition device includes a fixed camera coupled to a second rotationally movable polariser, each image in the series of images corresponding to a different setting of an axis of polarisation of the second polariser.
- the image processing device includes an image display device displaying at least one image of the foundry piece with a marking of the disoriented crystal lattices.

BRIEF DESCRIPTION OF THE FIGURES

Further advantages and characteristics of the invention will become apparent upon reading the following description, illustrated by the figures in which.

DETAILED DESCRIPTION

An exemplary embodiment of a method and system for inspecting the surface condition of foundry pieces, configured to automatically determine inhomogeneity in the orientation of crystal lattices, is described in detail below, with reference to the appended drawings. This example illustrates the characteristics and advantages of the invention. It is reminded, however, that the invention is not limited to this example.

In the figures, identical elements are marked by identical references. For reasons of legibility of the figures, the size scales between the elements represented are not respected.

Figure 1:
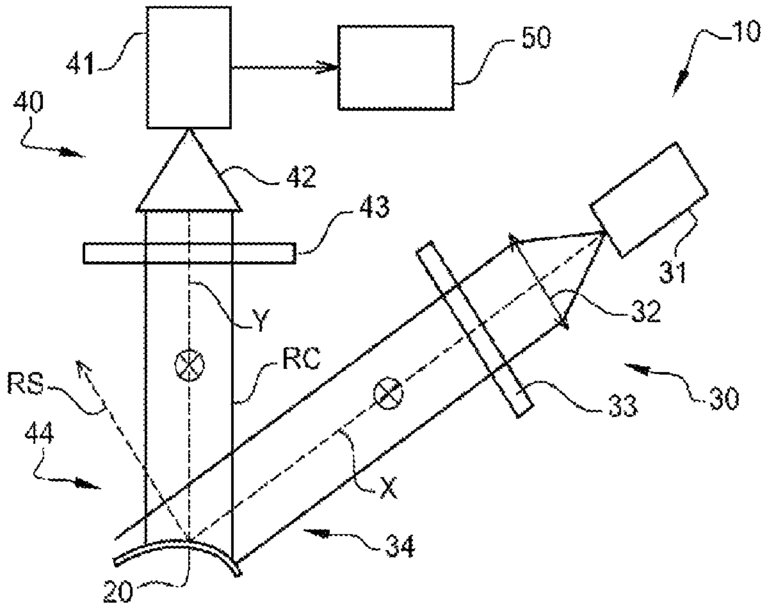
FIG. 1 schematically represents an example of a system for inspecting the surface condition of a piece according to the invention.

An example of a system 10 for inspecting the surface condition of single-crystal metal foundry pieces 20 is represented in FIG. 1. This system 10 includes a lighting device 30, an image acquisition device 40 and an image processing device 50. The lighting device 30 is designed to emit incoherent (or non-coherent), polarised, collimated light. The incident light beam 34 (also called the incident beam) has to be, on the one hand, linearly polarised (or electrically transverse) so that only the components of the incident beam parallel to the axis of polarisation are transmitted, and, on the other hand, collimated so that the piece 20 receives uniform lighting. Uniform lighting of the piece 20 allows each zone on the surface of said piece to receive the same light intensity, which makes it possible to detect any light deviations caused by disoriented crystal lattices, as explained below.

For this, in the example in FIG. 1, the lighting device 30 includes a non-coherent light source 31, that is, which does not produce interference. Lighting can be monochromatic or polychromatic because, as the piece 20 is a metal piece, its surface is reflective over a wide band of frequencies in the visible range. The light source 31 may be a conventional light source, an LED-type light source, a fibred light source, whether remote or not, or any other non-coherent light source.

The lighting device 30 also includes collimation optics 32, such as a collimation lens, and a linear polariser 33, called the first polariser, both coupled to the light source 31 and aligned along the lighting axis X. The order in which the collimating lens 32 and the first polariser 33 are positioned behind the light source 31 is of little importance since the incident beam 34 emitted by the lighting device towards the piece 20 is both polarised and collimated.

The first polariser 33 is a linear transmission polariser. Different technologies for constructing such a linear polariser can be contemplated: for example, a dichroic film, a micro-gate or prolate nanoparticles. In the invention, the first polariser 33 is preferably chosen to have low scattering and a maximum extinction ratio at the wavelength considered. The axis of polarisation of the first polariser 33, called the axis of incident polarisation, is set for the entire duration of the inspection of the piece 20. The first polariser 33 can therefore be fixed. According to an alternative, the first polariser 33 can be mounted on a rotating mount, which makes it possible to choose the axis of incident polarisation and possibly modify the same for the inspection of another piece 20. The axis of incident polarisation is preferably chosen so that the incident light beam 34 is electrically transverse, that is, perpendicular to the plane of incidence. In the invention, as the reflective surface is a metal surface, said surface is considered to be a perfect conductor. The reflection 44 of the incident beam 34 therefore occurs without any loss of energy and the angle of reflection obeys the Snell Descartes laws.

In the embodiment represented in FIG. 1, the light source 31 and the first polariser 33 are two distinct elements, aligned with each other along the lighting axis X. In another embodiment, the light source 31 is a polarised source integrating the first polariser. The polarised light source is then preferably rotationally movable so that the operator can position said light source along the chosen axis of incident polarisation.

The incident light beam 34 which lights the piece 20 is linearly polarised so that the reflection coefficient of said piece, called the Fresnel reflection coefficient, depends on both the angle of incidence and the state of polarisation of the incident light. The optical response of the surface of the piece 20, that is, the reflected light beam 44 (also called the reflected beam), includes two major components:

- a weakly dispersive specular reflection RS that comes from the average surface condition of the piece 20 (with random roughness). This reflection is predominant in intensity and keeps the same axis of polarisation orientation as the incident light.
- a reflection RC from the oriented faces of the crystal lattices. This reflection, produced by said oriented faces, can be seen as the common reflection of a multitude of micro-mirrors oriented in a same direction.

The optical response of the surface of the piece 20 is detected by the image acquisition device 40 and analysed by the image processing device 50. The image acquisition device 40 includes a camera 41 equipped with a lens 42 and coupled to a polariser 43, called the second polariser, mounted in front of the camera lens 42. The camera 41 may be, for example, a CCD or CMOS type camera in the visible range. The camera lens 42 is an optical lens whose characteristics are adapted, in terms of field of view and working distance, to the size of the zone to be imaged on the piece 20. This lens 42 can be, for example, of the telecentric type so as to favour a large depth of field. The second polariser 43, aligned with the camera 41 and its lens 42 along the reflection axis Y, is of the same type as the first polariser 33, that is, of the linear type. It may even be identical to the first polariser.

According to the invention, the second polariser 43 is rotationally movable so that its axis of polarisation can be modified for each image acquisition in order to obtain a series of images each corresponding to a different polarisation angle. For this, the second polariser 43 can be attached to a rotating mount, not represented in the figure, so that its axis of polarisation, called the axis of reflected polarisation, can be rotated. The rotating mount can be manipulated manually by an operator. Advantageously, it can be motor-driven to rotate automatically. Rotating the second polariser 43 makes it possible to acquire, by means of the camera 41, several images with different polarisation angles. If the axis of the second polariser 43 is oriented in the same direction as the axis of the reflected polarisation, then the light intensity transmitted in the camera is maximum. Conversely, if the axis of the second polariser 43 is rotated by 90° (the so-called cross-polariser configuration), the transmission of light intensity is minimum. Between these two angles, the transmission of light intensity follows Malus' law: $I_{trans}=I_{inc}\cos^2\theta$, where θ is the angle formed between the axes of the two polarisers 33 and 43.

In one embodiment, the camera 41 is a polarimetric camera that directly integrates a polariser. In such a polarimetric camera, the pixels of the camera sensor are equipped with polarisers and are therefore sensitive to the axis of polarisation and to the intensity of the beam 44 reflected on the sensor. In a single acquisition, it is then possible to obtain the same images as by rotating the axis of polarisation of the second polariser 43, the difference being that the number of images is limited to the number of predefined polarisation angles, for example four angles at 0°, 45°, 90° and 135°.

The image processing device 50 is a processing unit, such as for example a computer, adapted to perform the image processing operations described below. It is connected by a wired link or wireless link to the camera 41 in order to receive the series of images acquired by the camera 41. This image processing device 50 includes at least one image display device, such as a screen or a printer, for displaying the result of the inspection of the piece 20.

The inspection system 10 as just described makes it possible to implement cross-polarisation between the lighting device 30 and the image acquisition device 40. With this cross-polarisation, each grain corresponding to a particular crystal orientation has, after reflection on the surface of the piece 20 and transmission in the second polariser 43, a particular optical response in intensity which depends on the chosen position of the axis of incident polarisation and the setting of the axis of reflected polarisation. Indeed, it is accepted that the facets of each crystal lattice orientate the axis of polarisation of the reflected light differently, as described in the article entitled "Correlation of Polarized Light Phenomena With the Orientation of Some Metal Crystals", by C. J. Newton and H. C. Vacher, in Journal of Research of the National Bureau of Standards Vol. 53, No. 1, July 1954. In other words, each disorientation of the crystal lattice propagates the light beam in the camera 41 with a reflection coefficient that is specific thereto, as it depends on the direction of polarisation of the incident beam. This principle makes it possible to distinguish the different grains making up the surface of the piece 20.

Figure 2:
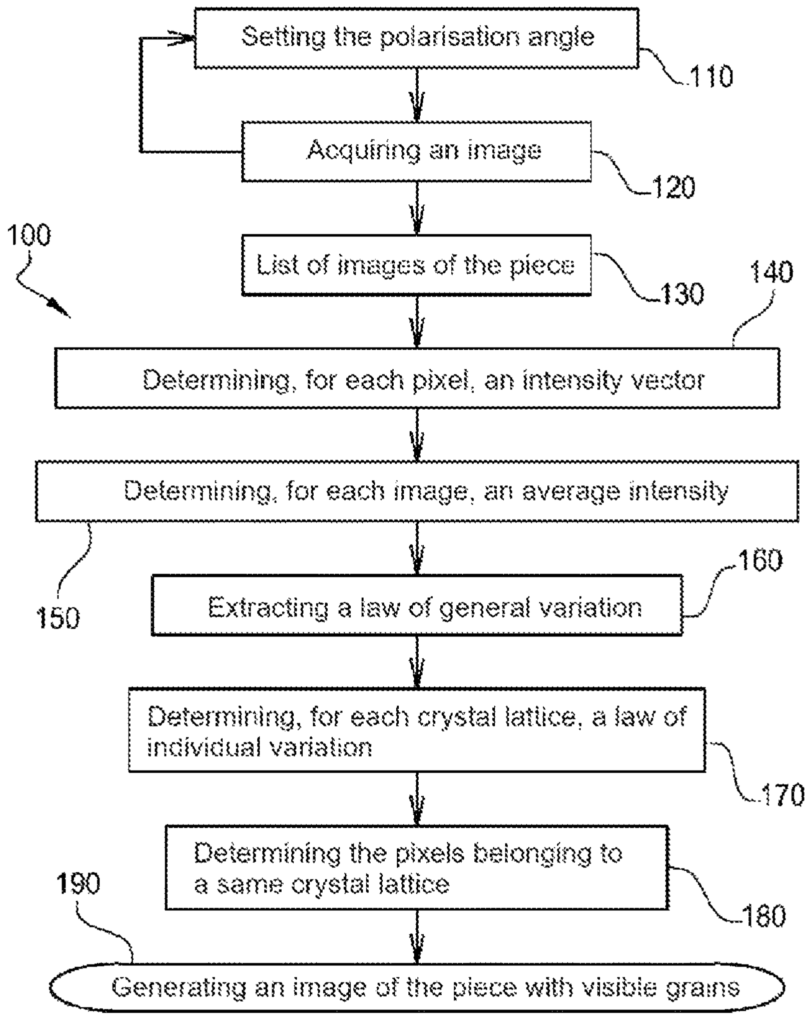
FIG. 2 represents, in functional form, an example of the operations of the method for inspecting the surface condition of a piece, according to the invention.

The optical response of the different grains of the surface of the piece 20 is analysed by means of steps 140 to 180 of the method for inspecting the condition of the surface of the piece 20. An example of this inspection method 100 is represented functionally in FIG. 2. As can be understood from the above, the first operations of the inspection method 100 consist in generating a series 130 of images of the surface of the piece 20 or of the zone of the piece 20 to be inspected. Indeed, as a function of the dimensions of the piece 20 to be inspected, the image acquisition device 40 can make images of the entire surface of the piece 20 or of a zone of this surface. For example, for a turbine blade, whose dimensions are relatively large, the inspection of the surface condition of the blade can be performed zone by zone, each zone being the subject of a series of images analysed as explained below, each series of images being analysed one after the other. In the remainder of the description, the inspection method 100 will be described for images of the entire surface of the piece, it being understood that the images may relate to only one zone of the surface of the piece.

The series 130 of images of the surface of the piece 20, more simply called images of the piece, is made by means of the image acquisition device 40 by making an image of the piece for each polarisation angle and by modifying the polarisation angle before each image is taken. The angle between the axis of polarisation of the first polariser 33 and the axis of polarisation of the second polariser 43 is called the "polarisation angle". In other words, before each image is taken, the second polariser 43 is set to a different position from its previous position in order to modify the axis of analysis polarisation and, consequently, the polarisation angle. The inspection method 100 thus includes a first operation 110 of setting the polarisation angle by rotating the axis of polarisation of the second polariser 43. It then includes an operation (120) of acquiring an image of the piece (20) by the camera (41) for the polarisation angle set. Several images are thus made. By repeating the image acquisition operation 120 and the operation 110 of setting the polarisation angle, a series 130 of images of the piece is obtained. This series 130 of images of the piece 20, consisting of several images of the same piece 20 at several polarisation angles, is then analysed by means of the operations 140 to 180 of the method 100 in order to determine the presence of grains, that is crystal lattices with orientations different from that of most of the crystal lattices on the surface of the piece 20. The series of images 130 includes several images, for example, one or several tens of images, the number of images having to be sufficient to allow the construction of a substantially sinusoidal curve, as explained below. In a practical example, the rotation of the axis of polarisation of the second polariser 43 can be modified by a pitch of 10° in a range between 0° and 360°. It should be noted that the image acquisition for polarisation angles between 0° and 180° is in theory identical to that for angles between 180° and 360° due to the periodicity of rotation of the axis of the second polariser 43; image acquisition for polarisation angles between 0° and 180° may therefore be sufficient; however, it may be chosen to also acquire images over the range between 180° and 360°, for example to increase the signal-to-noise ratio of the data determined in the remainder of the method 100 and/or if the axis of incident polarisation is not perfectly oriented perpendicular to the plane of incidence.

In order to reveal the crystals on the surface of the piece 20 and thus facilitate the analysis, the inspection method of the invention may include a preliminary operation, not represented in the figures, of chemically etching the surface of the piece 20. Chemical etching has the effect of slightly hollowing out the material on the surface of the piece 20 in order to make the crystal lattices appear flush with the surface. This chemical etching is performed before the series of images is made (operations 110 to 130).

Figure 3:
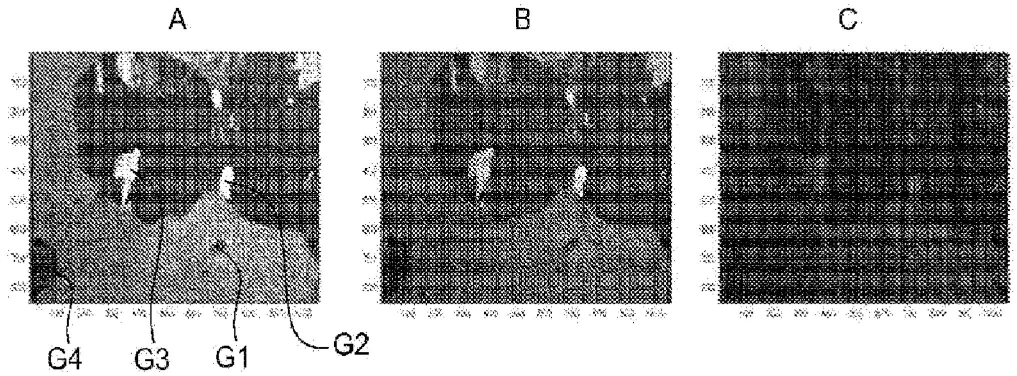
FIG. 3 represents examples of three images in a series of images made for several different polarisation angles.

An example of a series of three images is represented in FIG. 3. These three images represent the same portion of turbine blade, after chemical etching, for three positions of the axis of polarisation of the second polariser 43 and therefore three different polarisation angles. Image A corresponds to the blade portion for a polarisation angle of 0°; image B shows the same blade portion for a polarisation angle of 45°; image C still shows the same blade portion for a polarisation angle of 90°. It is clear from these three images A, B and C that there are several portions of the piece 20 where the crystal orientations differ. These portions of the piece 20, referenced G1, G2, G3 and G4, correspond to surface defects in the piece 20.

After the series of images 130 has been made, the inspection method 100 includes operations for analysing this series of images. This analysis first includes an operation 140 of determining an intensity vector, for each pixel of the sensor of the camera 41. Since all the images in the series of images 130 correspond to the same zone of the piece 20 and the piece 20 is not moved, the images in the series of images 130 can be superimposed on one another; it is then possible to look at the change, that is the variation, over time in the grey levels of the same pixel across the series of images. The same pixel has a different grey level in each image in the series of images 130. The variation in this grey level of the pixel through the different images of the series of images 130 forms an intensity vector of said pixel.

Figure 4:
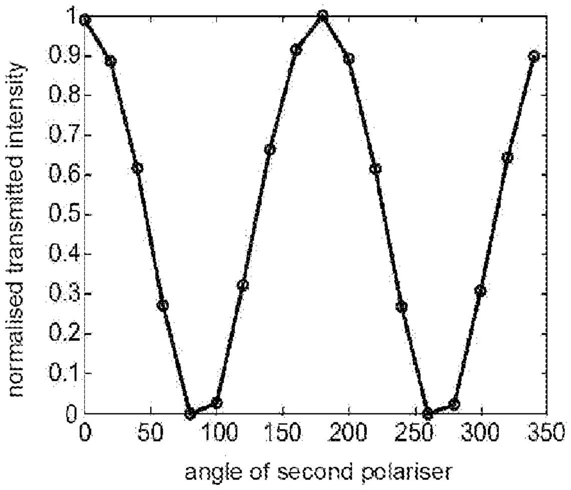
FIG. 4 represents an example of the average intensity of the pixels of one image in the series of images, determined in the method of FIG. 2.

The method 100 then includes an operation 150 of determining a normalised average intensity of all the pixels of each image in the series of images 130. This operation 150 consists in calculating the average of the light intensity of all the pixels of the same image and in deducing therefrom, in operation 160, a law of general variation for the series of images 130. This law of general variation corresponds to the so-called "Malus's law" which is the law relating to the transmission, through the second polariser 43, of the light beam 44 reflected by the piece 20 and corresponding to the average roughness of the surface of said piece 20. The intensity from the oriented faces of the crystal lattices makes up the majority of the total signal because the piece 20 is not a pure lattice array. FIG. 4 represents, in the form of an overall sinusoidal curve, an example of the law of general variation obtained at the end of operation 160. This curve in FIG. 4 shows an example of the normalised average intensity, transmitted by the second polariser 43, for several polarisation angles between 0° and 360°, the maximum intensity being obtained when the first and second polarisers are in phase, the minimum intensity being obtained when the first and second polarisers are crossed.

The method 100 then includes an operation 170 of determining a law of individual intensity variation, that is a law of variation specific to each crystal lattice. For this, operation 170 consists, for each image in the series of images, in normalising the intensity of each pixel in the image between 0 and 1, by dividing this intensity by the value of the average intensity of the corresponding image. This amounts to dividing the intensity vector of each pixel in the series of images by the law of general variation, or Malus's law. This operation 170 eliminates the variation component of the specular reflection from the surface of the piece 20 and enhances intensity variations due to the reflections from the facets of the crystal lattices. Indeed, as explained previously, it is accepted that the facets of a crystal lattice orientate the axis of polarisation of the reflected light differently so that each grain corresponding to a particular orientation of the crystal lattice has a specific intensity variation as a function of the position of the axis of rotation of the second polariser 43. Thus, at the end of operation 170, the law of variation specific to each crystal lattice (called the law of individual variation), is determined.

Figure 5:
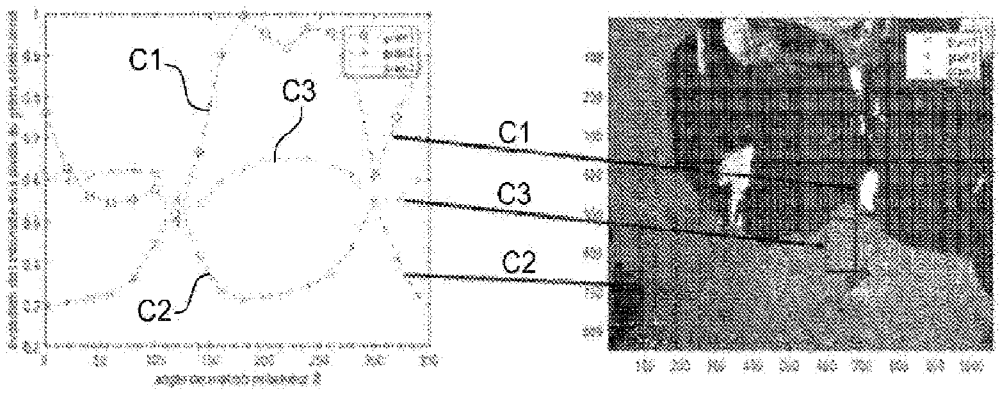
FIG. 5 represents an example of the individual intensity variation corresponding to three different grains, after analysis by the method in FIG. 2.

An example of the intensity variations of pixels belonging to three different grains is represented in FIG. 5, these variations being determined by means of the different operations of the inspection method 100 described above. In particular, the curve C1 corresponds to the intensity variation of the pixels of a first grain, the curve C2 corresponds to the intensity variation of the pixels of a second grain and the curve C3 corresponds to the intensity variation of the pixels of a third grain. These three variation curves, which are very different from each other, show that the crystal lattices corresponding to these curves have different orientations. If the orientation of these crystal lattices were homogeneous, the three curves would be more or less parallel. It should be noted that these differences in intensity variations are noticeable due to the normalisation of the intensity of the pixels; it is the normalisation operation that makes the intensity variations generated by the disorientation of the crystal lattices perceptible.

The inspection method 100 then includes an operation 180 of determining the pixels belonging to a same crystal lattice. This operation 180 consists in matching pixels having alike intensity variations. Pixels with close intensity variations, that is, similar or highly correlated, belong to a same grain or have a same crystal orientation. Matching the pixels is carried out by scanning all the pixels in the series of images and, using a similarity method, by checking whether the intensity vectors of two pixels have similarities. If the measurement of similarity between the two intensity vectors is greater than a predetermined threshold, then the two pixels are considered to be matched. On the other hand, if the measurement of similarity between the two intensity vectors is less than the predetermined threshold, then the two pixels are considered not to belong to a same crystal lattice. Several similarity methods can be used, such as for example, correlation, the so-called "squared intensity differences" method, the so-called "absolute intensity differences" method or that called "mean absolute difference". The segmentation of the different grains on the image is then deduced from this matching operation.

The inspection method 100 finally includes an operation 190 of generating an image of the piece 20 on which the disoriented crystal lattices are marked, for example by a contour of the lattice, a box, etc. An example of such an image is represented in FIG. 5 where the three grains, or disoriented crystal lattices, are surrounded by a rectangular frame.

The inspection method 100 can be coupled to a conventional multidirectional reflectance measurement technique, as described especially in the articles "Measuring crystal orientation from etched surfaces via directional reflectance microscopy" by Wang Xiaogang, in J Mater Sci (2020) 55:11669-11678 and "Optical characterization of grain orientation in crystalline materials" by Bernard Gaskey, in Acta Materialia 194 (2020) 558-564. Coupling the method of the invention with this conventional technique would make it possible to minimise the number of lighting angles and improve the signal-to-noise ratio on weak signals.

Although described through a number of examples, alternatives and embodiments, the method according to the invention for inspecting the surface condition of a foundry piece and the system for implementing this method comprise various alternatives, modifications and improvements which will be obvious to the person skilled in the art, it being understood that these alternatives, modifications and improvements are within the scope of the invention.

The invention claimed is:

1. A method for inspecting a surface condition of a single-crystal metal foundry piece, the surface of the piece including possible defects resulting from an inhomogeneous orientation of at least one crystal lattice of the single-crystal metal, said method including:

- acquiring, by an image acquisition device, a series of images of the foundry piece lit by a polarised, collimated lighting device, and then
- analysing the series of images by an image processing device, said analysing including the following operations:
  - determining, for each pixel of the image acquisition device, an intensity vector corresponding to an intensity variation of the same pixel in each image in the series of images,
  - determining an average intensity of all the pixels of each image in the series of images and extracting a law of general intensity variation for the series of images,
  - determining a law of individual intensity variation, specific to each crystal lattice, and
  - determining the pixels belonging to a same crystal lattice, each image in the series of images being made for a different polarisation angle, which is modified by rotating an axis of polarisation of the image acquisition device, the polarisation angle being the angle between an axis of polarisation of a first polariser that is part of the lighting device and an axis of polarisation of a second polariser that is part of the image acquisition device.

2. The inspection method according to claim 1, wherein the operation of determining the pixels belonging to a same crystal lattice is obtained by matching the pixels having alike intensity variations.

3. The inspection method according to claim 1, wherein the operation of determining a law of individual intensity variation is obtained by normalising the intensity of each pixel as a function of the law of general intensity variation.

4. The inspection method according to claim 1, wherein the lighting device generates a beam of incoherent, linearly polarised light.

5. The inspection method according to claim 1, further comprising a prior operation of chemically etching the foundry piece revealing the crystals on the surface of the foundry piece.

6. A system for implementing the inspection method according to claim 1, comprising:

- a polarised, collimated lighting device,
- an image acquisition device, and
- an image processing device.

7. The inspection system according to claim 6, wherein the lighting device includes an incoherent light source coupled to a first linear polariser and to collimation optics.

8. The inspection system according to claim 6, wherein the image acquisition device includes a fixed camera coupled to a second rotationally movable polariser, each image in the series of images corresponding to a different setting of an axis of polarisation of the second polariser.

9. The inspection system according to claim 6, wherein the image processing device includes an image display device displaying at least one image of the foundry piece with marking of disoriented crystal lattices.

* * * * *